(No Model.) 3 Sheets—Sheet 1.

J. VLADYKA & W. M. MITCHELL.
APPARATUS FOR CREMATING FILTH AND SEWERAGE.

No. 379,189. Patented Mar. 6, 1888.

Witnesses:
Isaac Brandt.
T. B. Lyon.

Inventors
Joseph Vladyka.
Willis M. Mitchell.
by E. Campbell.
their Attorney.

(No Model.) 3 Sheets—Sheet 2.

J. VLADYKA & W. M. MITCHELL.
APPARATUS FOR CREMATING FILTH AND SEWERAGE.

No. 379,189. Patented Mar. 6, 1888.

(No Model.) 3 Sheets—Sheet 3.

J. VLADYKA & W. M. MITCHELL.
APPARATUS FOR CREMATING FILTH AND SEWERAGE.

No. 379,189. Patented Mar. 6, 1888.

Witnesses:
Isaac Brandt.
J. F. Conrad.

Inventors:
Joseph Vladyka.
Willis M. Mitchell.
By Campbell
Atty.

UNITED STATES PATENT OFFICE.

JOSEPH VLADYKA AND WILLIS M. MITCHELL, OF NEWTON, IOWA.

APPARATUS FOR CREMATING FILTH AND SEWAGE.

SPECIFICATION forming part of Letters Patent No. 379,189, dated March 6, 1888.

Application filed March 29, 1886. Serial No. 196,976. (No model.)

*To all whom it may concern:*

Be it known that we, JOSEPH VLADYKA and WILLIS M. MITCHELL, of Newton, in the county of Jasper and State of Iowa, have invented certain new and useful Improvements in Apparatus for Cremating Filth and Sewage; and we do hereby declare the following to be a full, clear, and exact description of the invention, such as will enable others skilled in the art to which it pertains to make and use it, reference being had to the accompanying drawings, which form a part of this specification.

Our invention consists in the construction hereinafter described, and pointed out in the claims.

In order that our invention may be fully understood, we will proceed to describe it with reference to the accompanying drawings, in which—

Figure 1:
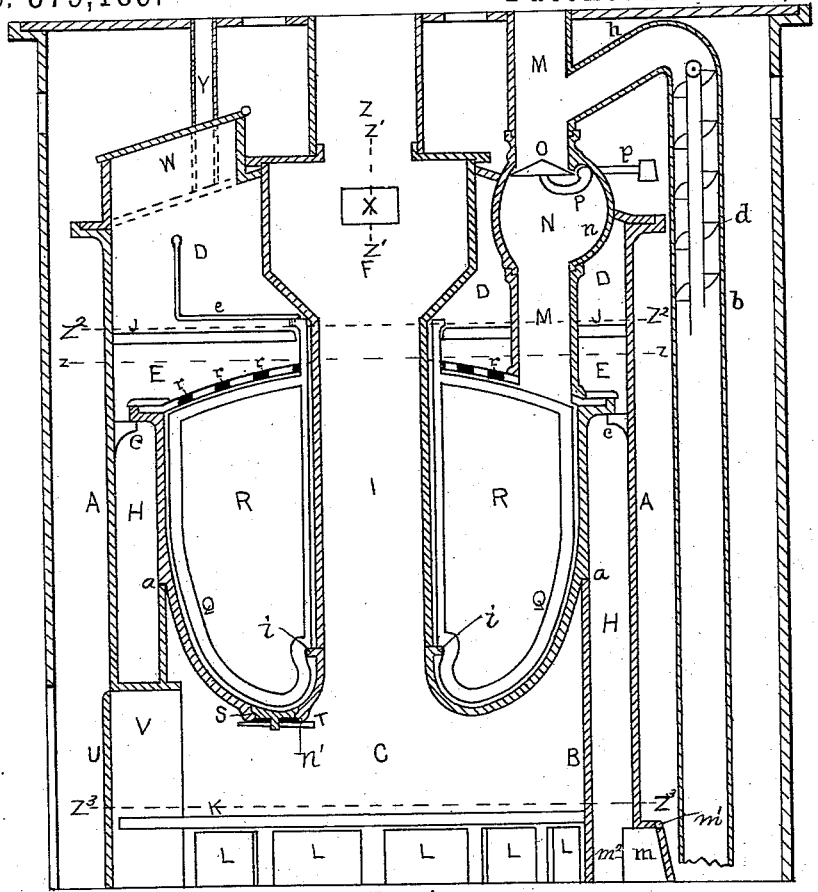
Figure 2:
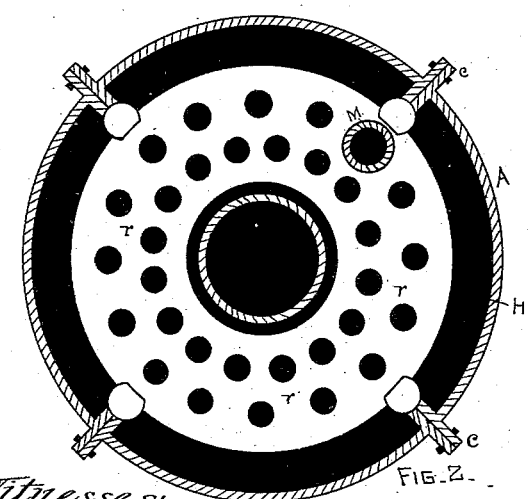
Figure 3:
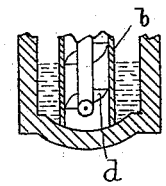
Figure 3:
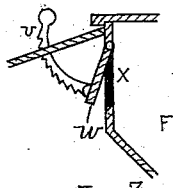
Figure 4:
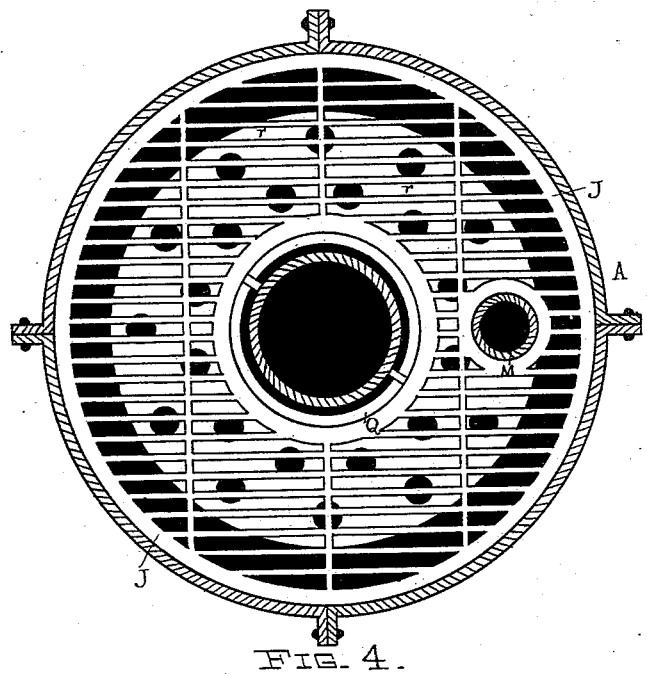
Figure 5:
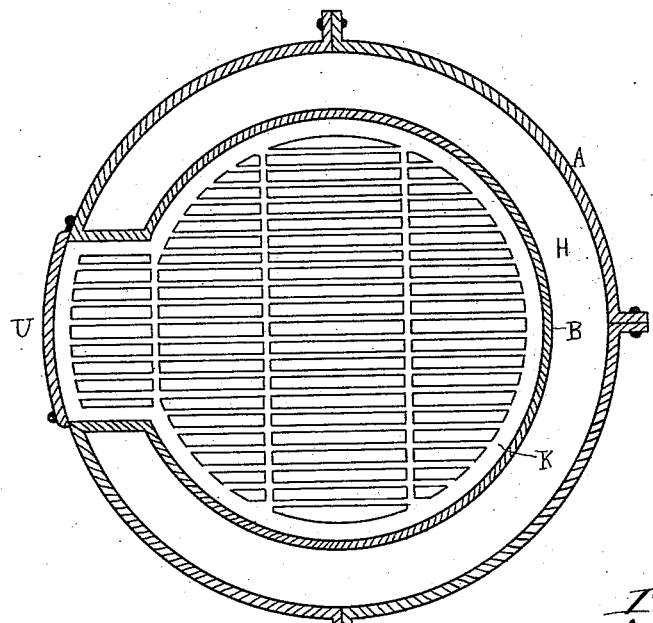
Figure 6:
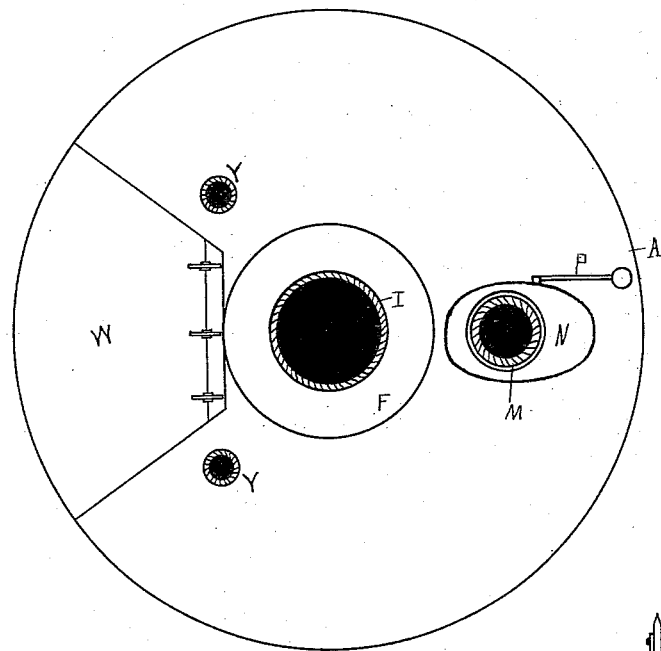
Figure 9:
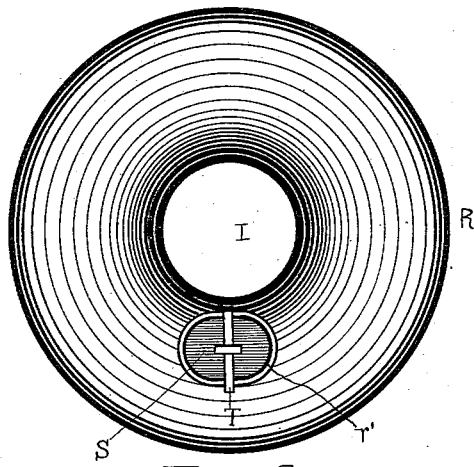
Figure 7:
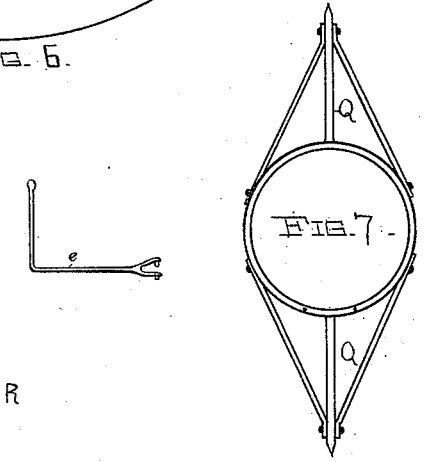
Figure 8:
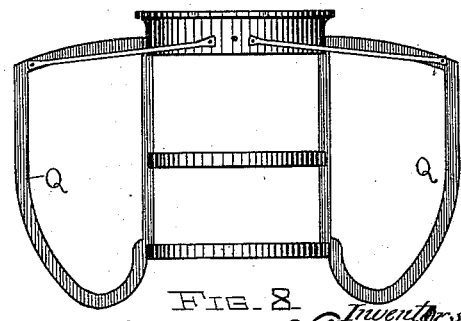

Figure 1 is a vertical section of our improved filth-cremating apparatus, the lower end of the conveyer being detached. Fig. 2 is a horizontal section on the line Z Z, Fig. 1. Fig. 3 is a detail view showing a vertical section of the damper portion of the combustion-chamber in the flue on the line Z' Z', Fig. 1. Fig. 4 is a horizontal section on the line $Z^2 Z^2$, Fig. 1. Fig. 5 is a horizontal section on the line $Z^3 Z^3$, Fig. 1. Fig. 6 is a top view of the body of the apparatus. Fig. 7 is a top view of the scraper or stirrer, the handle being detached. Fig. 8 is an elevation thereof. Fig. 9 is a bottom view of the retort.

Similar letters refer to similar parts in all of the several views

A represents the outer shell or cylinder of our improved filth-cremator, of any suitable dimensions, inclosing the inner shell, B, the upper furnace, D, and combustion-chamber E, the cremating-retort R, having flues I, the lower furnace, C, and the combustion-chamber F. The cremating-retort is supported on the inner cylinder, B, by the flange $a$ and by the lugs $c$ $c$ on the outer shell, A. The retort is covered by the perforated lid $r$ and has an elliptical opening, $r'$, in the bottom, closed by stopper S, which is held in place by wedge T, and contains a revolving scraper supported on projections $i$ $i$, having wings Q Q. The scraper is operated by the detachable lever or handle $e$.

M represents the supply-pipe connecting the retort R with any closet, sink, or ash-bin, which is closed by a self-regulating cone-shaped valve, O, hung on a curved lever, P, in the basket-shaped chamber N, and kept in place by weighted lever $p$.

W is a fuel-chamber over the upper furnace, D.

Z is the smoke-pipe leading from the combustion-chamber F.

The material to be cremated is admitted to the pipe M from any sink or closet, and, passing down, strikes the cone-shaped valve O, which is borne down and to one side, moving on lever P into the recess $n$ in the bulb or basket shaped chamber N, allowing a clear passage into the cremating-retort R. The valve O is automatically closed again by the weighted lever $p$. A fire is first kindled in the upper furnace, D, heating the combustion-chambers E and F. The fire in furnace C is then started, heating the bottom of the retort R and driving the steam and gases generated through the perforated lid $r$ into the combustion-chamber E. The heat and flames from the upper furnace, D, are carried by the downdraft from the air-pipes Y Y, through the grate J, into the combustion-chamber E, where they mingle with and consume the gases generated in the cremating-retort R, escaping through the perforated lid $r$ into chamber E. The smoke escaping from the combustion-chamber E is carried by the draft down the space H between the outer and the inner shells to the bottom of the cremator, passing through the openings L L in the inner shell and up through the grate K into the lower furnace, C, supplying the furnace C with its draft. The escaping smoke from the furnace C passes up through the retort, through the flue I, to the combustion-chamber F, and is there finally consumed by the heat of the surrounding upper furnace, D, and by flames admitted into the chamber F from the furnace D through the opening X. (See Fig. 3.) The draft through the opening X is regulated, or the opening may be entirely closed, by the door or damper $w$, moved by the notched lever $v$. The door $m$ in the bottom of the outer shell, A, and hinged thereto at $m'$, closes an opening, $m^2$, which communicates with the ash-pit under furnace C, forming a damper, by which the draft of the furnaces is regulated, and also allowing the convenient removal of the ashes. When the damper is closed, all the draft of the furnaces is supplied by the air-pipes Y Y and tends constantly downward through the passage H into the lower furnace and through flue I to the combustion-chamber F, accomplishing the complete combustion of all vapors and gases generated in the retort R and escaping into combustion-chamber E through the perforated lid r, and the consumption of the smoke of the furnaces by the successive passage through the combustion-chamber E, the lower furnace, C, and the combustion-chamber F. If by any accident the valve O in the pipe M should remain open or become broken, the pipe M would act as a draft-flue similar to Y Y, carrying a current of air down into the retort R and thence up through the perforations in the lid r into combustion-chamber E, passage H, and furnace C, effectually preventing the escape of any gases from the retort R through the pipe M. When the cremation of the material in the retort is completed, the door U in the outer shell, A, is opened, giving access through the chute V to the interior of the inner shell, B, and the bottom of the retort R, the wedge T is removed, and the stopper S lifted up and taken out through the elliptical opening. The scraper is then revolved by means of lever e, and the refuse and ashes remaining in the retort R unconsumed are scraped out through the opening into the ash-pit below the furnace C and removed.

The cremator may be connected with any sewer trap or well by an elevator, b, having an endless belt or chain carrying buckets d d d d, and connected by pipe h with pipe M in such a manner that the contents of the sewer may be conveyed into the retort R for cremation. Our cremating apparatus may also be cased in or placed within a suitable furnace-chamber or heating-room, as shown in Fig. 1, and the heat which is radiated from the cremator thus utilized for heating the building in which it is placed, as an ordinary hot-air furnace.

We are aware that prior to our invention other devices have been made for cremating night-soil, filth, and sewage in suitable cremating-retorts; but our claim is for a filth-cremator which has a constant downdraft, preventing the escape of any gases or foul air through connecting supply-pipes, and which burns the smoke of combustion and consumes all gases generated in the cremating-retort by the device and in the manner substantially as herein specified.

We do not limit ourselves to the specific construction of our cremating apparatus herein set out; but, referring to the foregoing description of our invention,

What we claim as new, and desire to secure by Letters Patent, is—

1. The combination of a lower furnace, an upper furnace, a retort intermediate of the furnaces, and two shells surrounding the retort and furnaces, providing a downdraft-flue connecting the furnaces, substantially as described.

2. The combination of the outer shell, A, the inner shell, B, having openings at the bottom, forming with the shell A a flue H, the retort R, having a central flue and perforated lid, the grate K within the shell B beneath the retort, the grate J within the shell A over the retort, and a pipe leading into the retort, substantially as described.

3. The combination of two shells placed one within the other, a cremating-retort having a central flue and supported on the inner shell, the inner shell having an opening at the bottom and forming with the outer shell and retort lower furnace and combustion chambers, upper furnace and combustion chambers, and a flue around the retort connecting the upper combustion-chamber with the lower furnace-chamber, substantially as described.

4. The combination of two upright shells placed one within the other, a cremating-retort supported on the inner shell, having a perforated lid, supply-pipes connected with the retort, having suitable valves, draft-pipes entering the top of the outer shell, the inner shell having an opening at the bottom and forming with the retort and outer shell lower furnace and combustion chambers, upper furnace and combustion chambers, and a flue or combustion chamber around the retort connecting the upper combustion-chamber with the lower furnace-chamber, substantially as described.

5. In a filth and sewage cremator, the combination of the retort R, having central flue, I, and the scraper within the retort and adapted to revolve around the flue, substantially as described.

6. In a filth and sewage cremator, the combination of the retort R, formed with projections i i, the central flue, I, and the scraper supported around the flue on the projections, provided with wings Q Q, substantially as described.

7. In a filth and sewage cremator, the combination of two upright cylinders or shells placed one within the other, forming two furnace-chambers, and combustion-chambers connecting the furnace-chambers, a retort, R, formed with a central flue, I, and a perforated lid to the retort, substantially as described.

8. In a filth and sewage cremator, the combination of a retort, R, formed with a central flue, I, and an opening at bottom, a stopper closing said opening, and a scraper within the retort, substantially as described.

9. In a filth and sewage cremator, the combination of the outer cylinder, A, the grate J, pipes Y Y, the inner cylinder, B, having openings L, the grate K, the retort R, having a lid, r, and the pipe M, having a bulb-shaped chamber, N, provided with a counterbalanced valve, substantially as described.

10. The combination of the outer shell, A, having the lugs c, the inner shell, B, formed with openings L at the bottom, the retort R, having supporting flange and shoulders a, and central flue, I, formed with chamber F, having opening X, the pipes Y, the upper grate, J, the lower grate, K, the pipe M, having a bulb-shaped chamber, N, provided with a valve, O, and a smoke-pipe, Z, substantially as described.

JOSEPH VLADYKA.
WILLIS M. MITCHELL.

Attest:
W. O. McELROY,
ISAAC BRANDT.